(12) United States Patent
Sakoske et al.

(10) Patent No.: US 6,221,147 B1
(45) Date of Patent: Apr. 24, 2001

(54) BISMUTH MANGANESE OXIDE PIGMENTS

(75) Inventors: George Emil Sakoske; Joseph E. Sarver, both of Washington, PA (US); Miroslav Novotny, Denville, NJ (US)

(73) Assignee: Cerdec Aktiengesellschaft Keramischre Farben, Frankfurt (DE)

( * ) Notice: Subject to any disclaimer, the term of this patent is extended or adjusted under 35 U.S.C. 154(b) by 0 days.

(21) Appl. No.: 09/215,498

(22) Filed: Dec. 18, 1998

(51) Int. Cl.$^7$ ..................................................... C09C 1/00

(52) U.S. Cl. ............................. 106/479; 106/400; 106/401

(58) Field of Search ........................... 106/479; 428/426, 428/428; 501/17

(56) References Cited

U.S. PATENT DOCUMENTS 5,336,312 * 8/1994 Byrne et al. ....................... 106/479
5,747,395 * 5/1998 Smith et al. ......................... 501/5

OTHER PUBLICATIONS

Baidikova et al. "Characterization of bismuth–manganese oxide . . . " Appl. Catal., A, 89(2), 169–82, Sep. 1992.*
Tutov et al., "New Compounds in the Systems $Bi_2O_3$–$Me_2O_3$ ($Fe^{3+}$, $Al^{3+}$, $Ga^{3+}$, $Mn^{3+}$)", Soviet Physics—Solid State, Oct. 1964, pp. 963–964, vol. 6, No. 4.
Baidikova et al., "Oxidative Dehydrodimerization of Methane on Bi–Mn Oxides: Catalysts Active Component and Reaction Mechanism", Catalysts Today, 1992, pp. 511–516, vol. 13.

* cited by examiner

Primary Examiner—Mark L. Bell
Assistant Examiner—Michael J. DiVerdi
(74) Attorney, Agent, or Firm—Alan G. Tower; Eckert Seamans Cherin & Mellot, LLC

(57) ABSTRACT

Bismuth manganese oxide pigments are used as additives to various materials such as plastics, plastic or organic coating compositions, glass and ceramic coating compositions, and the like. The bismuth manganese oxide pigments preferably comprise $Bi_2Mn_4O_{10}$ crystallized in the orthorhombic crystal structure. The pigments possess improved reflectance characteristics, particularly in the IR region, and may reduce IR-induced heat buildup.

25 Claims, 3 Drawing Sheets

BISMUTH MANGANESE OXIDE PIGMENTS

FIELD OF THE INVENTION

The present invention relates to pigments for plastics, glasses and other types of materials, and more particularly relates to bismuth manganese oxide pigments.

BACKGROUND INFORMATION

Pigments are widely used in various applications such as paints, inks, plastics, rubbers, ceramics, enamels and glasses. For example, U.S. Pat. No. 5,336,612 to Byrne et al. discloses bismuth-containing colorants.

SUMMARY OF THE INVENTION

The present invention provides bismuth manganese oxide pigments which may be used as additives to plastics, plastic or organic coating compositions, textiles, glass and ceramic coating compositions, and the like. The bismuth manganese oxide pigments preferably comprise $Bi_2Mn_4O_{10}$ having an orthorhombic crystal structure. The pigments provide improved heat buildup properties.

The bismuth manganese oxide pigments of the present invention may be used in many applications such as automotive and marine paints, and colored plastics such as vinyl siding, where one property of the bismuth manganese oxide pigments is very high infrared reflectance. These infrared reflective properties exhibit much less heat buildup and much higher infrared radiation reflectance in comparison with commercial black pigments.

Another use is in the ceramic industry in applications such as enamel borders around windshields, back lights, etc. used for automobiles to enhance appearance and to prevent ultraviolet (UV) degradation of underlying adhesives.

Compositions including the present bismuth manganese oxide pigments also have advantages in architectural, container, and other glass or ceramic decorative applications where reduced heat buildup is desired.

Another property exhibited by the present bismuth manganese oxide pigments is the ability to render a surface markable when exposed to a laser, allowing the formation of a high contrast mark with minimal disruption of the surface. Some laser marking uses would be in plastics, organic coatings, metal marks, and any other type of similar mark which can be made readable by interaction with the laser beam.

An aspect of the present invention is to provide a pigment comprising bismuth manganese oxide. The bismuth manganese oxide preferably comprises $Bi_2Mn_4O_{10}$ having an orthorhombic crystal structure.

Another aspect of the present invention is to provide a coating composition including a liquid carrier and a pigment comprising bismuth manganese oxide dispersed therein.

A further aspect of the present invention is to provide an enamel composition comprising glass frit and bismuth manganese oxide pigment.

Another aspect of the present invention is to provide an article including a substrate matrix and bismuth manganese oxide pigment dispersed in the matrix.

A further aspect of the present invention is to provide an article including a substrate and a coating comprising a bismuth manganese oxide pigment covering at least a portion of the substrate.

Another aspect of the present invention is to provide a method of making a bismuth manganese oxide pigment. The method includes the steps of mixing powders of bismuth oxide and manganese oxide and calcining the mixture.

A further aspect of the present invention is to provide a method of coloring a substrate. The method includes the steps of providing a substrate, and adding a bismuth manganese oxide pigment to the substrate. The bismuth manganese oxide pigment may be dispersed in the substrate or coated on the substrate.

These and other aspects of the present invention will be more apparent from the following description.

DETAILED DESCRIPTION

Figure 1:
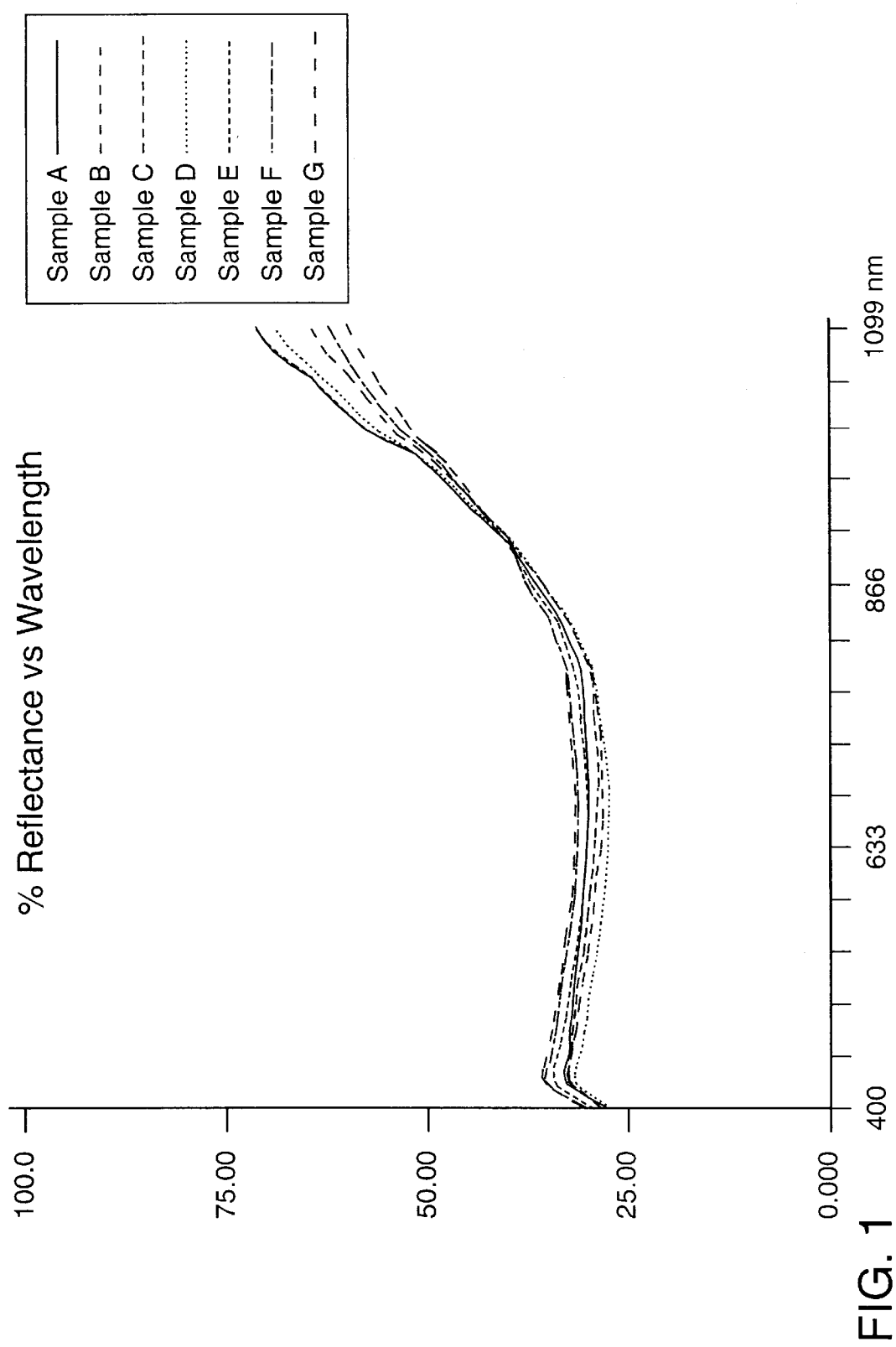
FIG. 1 is a graph illustrating visible and infrared reflectance characteristics for various bismuth manganese oxide pigments of the present invention.

This invention relates to the use of bismuth manganese oxide as a pigment. The bismuth manganese oxide pigment preferably comprises $Bi_2Mn_4O_{10}$ crystallized in the orthorhombic crystal structure. The present bismuth manganese oxide pigments are useful in many applications, including organic chemical compositions such as plastics, rubbers, and the like, coating compositions such as paints, printing inks, and the like, and inorganic chemical compositions such as glass enamels, porcelain enamels, and the like. The bismuth manganese oxide pigments have been found to impart unique properties such as high infrared (IR) reflectance. While not intending to be bound by theory, it is believed that the present bismuth manganese oxide pigment may impart such unique properties due to the electronic structure of the molecule and the interaction of this electronic structure with infrared light energy.

The present bismuth manganese oxide pigments preferably have average particle sizes of from about 0.1 to about 20 microns, more preferably from about 0.5 to about 5 microns.

The bismuth manganese oxide pigments may be formed by processes such as sol-gel and chemical precipitation. A particularly preferred process for making the present bismuth manganese oxide pigments is to mix bismuth oxide and manganese oxide powders, followed by calcination. The weight ratio of bismuth oxide to manganese oxide preferably ranges from about 1:2 to about 2:1. In this embodiment, the mixed powders are preferably calcined at temperatures of from about 810 to about 900° C., more preferably from about 840 to about 880° C. Calcination times of from about 3 to about 60 hours are preferred, more preferably from about 5 to about 15 hours.

In a preferred embodiment of the present invention, the bismuth manganese oxide pigment comprises $Bi_2Mn_4O_{10}$. However, a stoichiometric excess of either Bi or Mn may be present in the pigment. The pigment composition may be formed, for example, by mixing powders of $Bi_2O_3$ and $MnO_2$ in the appropriate ratio to form the desired composition, followed by calcining. For instance, 57.3 weight percent $Bi_2O_3$ and 42.7 weight percent $MnO_2$ may be mixed and calcined to form $Bi_2Mn_4O_{10}$. The ratio of $Bi_2O_3$ to $MnO_2$, or the ratio of other Bi-containing and Mn-containing compositions, may be adjusted in order to achieve the desired bismuth manganese oxide composition.

Table 1 lists visual characteristics of various bismuth manganese oxide pigments of the present invention using the conventional CIELAB color scale. Sample D comprises stoichiometric $Bi_2Mn_4O_{10}$ formed by calcining a stoichiometric mixture of $Bi_2O_3$ and $MnO_2$. Samples A, B and C listed in Table 1 are formed from the calcination of $Bi_2O_3/MnO_2$ mixtures comprising 20, 10 and 5 weight percent excesses of $Bi_2O_3$, respectively. Samples E, F and G are formed from the calcination of $Bi_2O_3/MnO_2$ mixtures comprising 5, 10 and 20 weight percent excesses of $MnO_2$, respectively.

TABLE 1

Color Characteristics of Bismuth Manganese Oxide Pigment Tint Trials

| Sample | L* | a* | b* | C* | h |
|---|---|---|---|---|---|
| A | 63.27 | −0.50 | −1.61 | 1.68 | 252.66 |
| B | 62.63 | −0.73 | −2.44 | 2.55 | 253.44 |
| C | 62.11 | −0.68 | −2.75 | 2.83 | 256.18 |
| D | 61.20 | −0.49 | −2.88 | 2.92 | 260.36 |
| E | 63.48 | −0.46 | −2.72 | 2.76 | 260.36 |
| F | 64.33 | −0.42 | −2.53 | 2.56 | 260.53 |
| G | 64.64 | −0.43 | −2.46 | 2.50 | 260.08 |

L* is lightness on a scale of 0 (black) to 100 (white); a* is red/green value on a scale of −60 (green) to +60 (red); b* is yellow/blue value on a scale of −60 (blue) to +60 (yellow); C* defines chroma (C = $(a^{*2} + b^{*2})^{1/2}$); and h is hue angle The bismuth manganese oxide pigments listed in Table 1 have very low red/green and yellow/blue values, and have moderate lightness values in the visible spectrum. The visible and IR reflectance characteristics of Samples A–G in Table 1 are shown in FIG. 1. The visible and IR measurements shown in FIG. 1 were made on a Datacolor Spectrophotometer. Higher IR reflectance values will yield lower heat buildup on a particular substrate.

Plastic or rubber compositions to which the bismuth manganese oxide pigments may be added in accordance with this invention include polymeric materials that are natural or synthetic. Examples include natural resins, rubber, chlororubber, casein, oil-modified alkyd resins, viscose, cellulose acetate, cellulose propionate, cellulose acetobutyrate, nitrocellulose, or other cellulose ethers or esters. Synthetic organic polymers produced by polymerization, polyaddition, or polycondensation in thermosetting or thermoplastics can also be colored by this invention. Examples are polyethylene, polystyrene, polypropylene, polyisobutylene, polyvinylchloride, polyvinylacetate, polyacrylonitrile, poly acrylic acid, other polyolefins and substituted polyolefins, as well as methyacrylic acid esters, butadiene, as well as copolymers of the above mentioned. Examples from polyaddition and polycondensation resins are the condensation products of formaldehyde with phenols, phenolic resins, urea, thiourea, and melamine, amino resins, polyesters, polyamides, polycarbonates, and/or silicones. These polymers can be present individually or as mixtures as plastic material or melts spun into fibers. They can also be dissolved as film formers or binders for lacquers, paints, or printing inks such as linseed oil, nitrocellulose, melamine resins, acrylic resins, ureaformaldehyde resins and the like.

In an embodiment of the present invention, a glass-ceramic enamel composition is provided comprising from about 0.1 to about 70 weight percent of the bismuth manganese oxide pigment and from about 30 to about 99.9 weight percent solids of glass frit compositions, or a combination of two or more frits. Additional oxide pigments may be added to the compositions such as $CuCr_2O_4$, $(Co,Fe)(Fe,Cr)_2O_4$, silica, alumina, wollastanite, feldspar, titania, and the like.

As used herein, the term "glass frit" means pre-fused glass material which is typically produced by rapid solidification of molten material followed by grinding or milling to the desired powder size. Preferred glass frits may comprise from 0 to about 75 weight percent lead oxide, from 0 to about 75 weight percent bismuth oxide, from 0 to about 75 weight percent silica, from 0 to about 50 weight percent zinc oxide, from 0 to about 40 weight percent boron oxide, from 0 to about 15 weight percent aluminum oxide, from 0 to about 15 weight percent zirconium oxide, from 0 to about 8 weight percent titanium oxide, from 0 to about 20 weight percent phosphorous oxide, from 0 to about 15 weight percent calcium oxide, from 0 to about 10 weight percent manganese oxide, from 0 to about 7 weight percent copper oxide, from 0 to about 5 weight percent cobalt oxide, from 0 to about 15 weight percent iron oxide, from 0 to about 20 weight percent sodium oxide, from 0 to about 20 weight percent potassium oxide, from 0 to about 15 weight percent lithium oxide and from 0 to about 7 weight percent fluoride, as well as other oxides conventionally used in glass frit compositions.

In addition to solid mixtures, the present bismuth manganese oxide pigments may be provided in liquid or paste form. Suitable liquid carriers for the bismuth manganese oxide pigments include pine oils, vegetable oils, mineral oils, low molecular weight petroleum fractions, tridecyl alcohols, synthetic resins and natural resins. When used in paints for architectural, automotive, marine and other applications, the bismuth manganese oxide pigment preferably comprises from about 0.1 to about 50 weight percent of the liquid paint composition, more preferably from about 1 to about 30 weight percent. For example, latex architectural paints preferably comprise from about 0.5 to about 50 weight percent of the bismuth manganese oxide pigments, with the remainder of the paint comprising water, resin and solvents. Oil-based paints preferably comprise from about 0.5 to about 50 weight percent of the present bismuth manganese oxide pigments, with the remainder comprising organic solvents, resin and additives.

In a particular embodiment, a printable enamel paste comprises from about 60 to about 85 weight percent of the above-listed glass-ceramic enamel solid powder mixture, plus from about 15 to about 40 weight percent of a suitable carrying vehicle or medium which can be applied on a substrate by screen printing, roll coating or spraying.

In a further embodiment, a substrate may be coated with the above glass-ceramic enamel composition, and then fired. The substrate may comprise, for example, automotive glass, architectural glass, container glass, metal or the like.

The use of the present bismuth manganese oxide pigments in coatings or materials such as carbon-carbon composites may also be advantageous with regard to IR reflection characteristics. As used herein, the term "IR reflectance" means the reflectance properties of a material at wavelengths above about 700 nm. The IR wavelengths include near-IR (750–2,000 nm), mid-IR (2,000–4,000 nm), and far-IR (4,000–5,500 nm). Plastic, rubber, paint and other compositions incorporating the present $Bi_2Mn_4O_{10}$ pigments may possess improved IR reflectance properties. Also, various types of substrates may be coated with the present pigments, such as wood, glass, ceramic, metal, plastic and composite substrates to provide an organic coating or paint which would contain and utilize the low heat buildup properties of the bismuth manganese oxide pigment.

Table 2 lists visible and IR reflectance characteristics of different materials. Samples 1 and 4 comprise bismuth manganese oxide pigments in accordance with the present invention, while Samples 2, 3, 5 and 6 comprise commercially available black pigments. Specifically, Sample 1 comprises 1 weight percent $Bi_2Mn_4O_{10}$ and 99 weight percent rigid polyvinylchloride (RPVC); Sample 2 comprises 1 weight percent $(Cr,Fe)(Fe,Cr)_2O_4$ and 99 weight percent RPVC; Sample 3 comprises 1 weight percent $CuCr_2O_4$ (Shepherd 1-G) and 99 weight percent RPVC; Sample 4 comprises 1 weight percent $Bi_2Mn_4O_{10}$, 9 weight percent $TiO_2$ and 90 weight percent RPVC; Sample 5 comprises 1 weight percent $(Cr,Fe)(Fe,Cr)_2O_4$, 9 weight percent $TiO_2$ and 90 weight percent RPVC; and Sample 6 comprises 1 weight percent $CuCr_2O_4$, 9 weight percent $TiO_2$ and 90 weight percent RPVC. The reflectance values listed in Table 2 are percentages.

TABLE 2

Reflectance Characteristics of Samples at Visible and IR Wavelengths

| Wavelength (nm) | Sample 1 Reflectance | Sample 2 Reflectance | Sample 3 Reflectance | Sample 4 Reflectance | Sample 5 Reflectance | Sample 6 Reflectance |
| --- | --- | --- | --- | --- | --- | --- |
| 400 | 7.01 | 6.00 | 6.21 | 32.72 | 33.22 | 32.57 |
| 500 | 7.15 | 5.94 | 6.06 | 43.80 | 43.97 | 42.81 |
| 600 | 7.41 | 5.99 | 5.70 | 43.92 | 42.11 | 39.43 |
| 700 | 8.15 | 6.81 | 5.74 | 44.55 | 41.89 | 37.19 |
| 800 | 10.22 | 17.63 | 6.02 | 47.68 | 58.79 | 35.77 |
| 900 | 16.39 | 29.47 | 7.55 | 55.91 | 69.28 | 38.46 |
| 1,000 | 33.12 | 42.13 | 9.22 | 70.38 | 76.77 | 41.97 |
| 1,100 | 54.59 | 38.88 | 7.44 | 81.85 | 73.82 | 36.96 |

Figure 2:
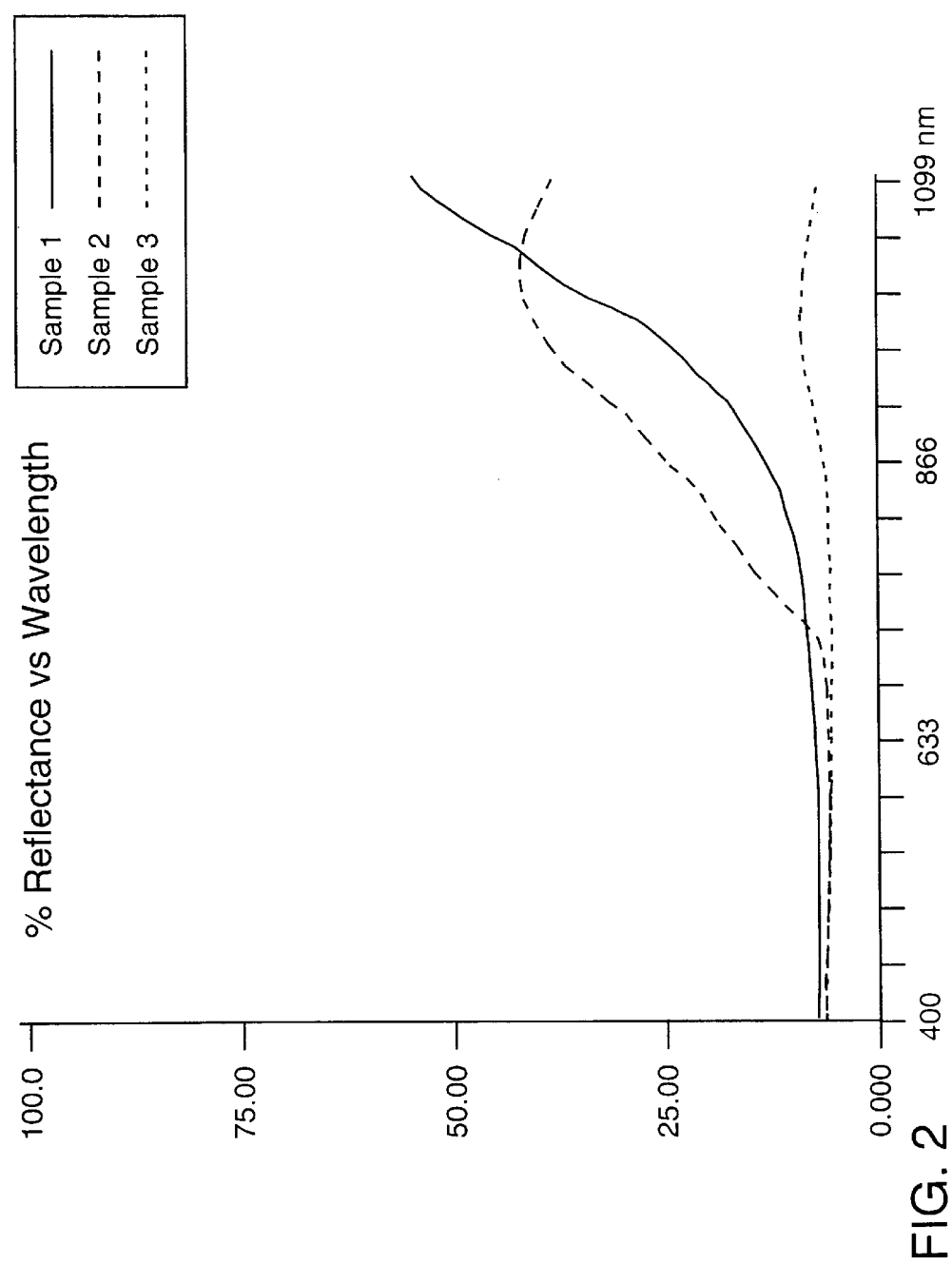
FIG. 2 is a graph showing visible and infrared reflectance characteristics of a material comprising a bismuth manganese oxide pigment of the present invention in comparison with conventional materials.
Figure 3:
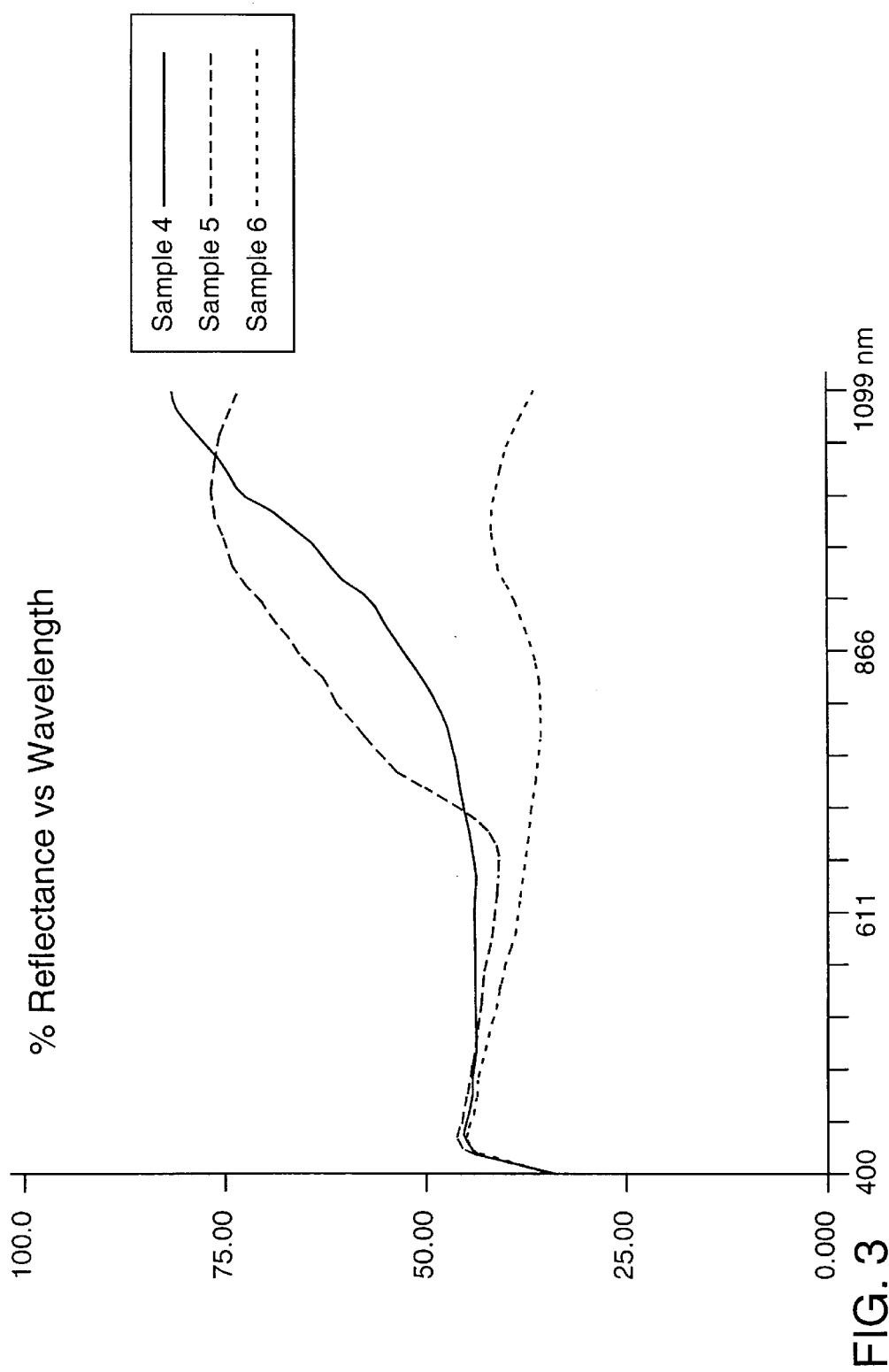
FIG. 3 is a graph showing visible and infrared reflectance characteristics of a material comprising a bismuth manganese oxide pigment of the present invention in comparison with conventional materials.

The visible and infrared reflectance properties of Samples 1–3 are graphed in FIG. 2, while the visible and IR reflectance characteristics of Samples 4–6 are graphed in FIG. 3.

As illustrated in Table 2 and FIGS. 2 and 3, materials comprising the present bismuth manganese oxide pigments possess comparable reflectance characteristics at visible wavelengths, but possess markedly increased reflectance characteristics at IR wavelengths in comparison with materials comprising conventional black pigments. The present bismuth manganese oxide pigments thus appear relatively dark at visible wavelengths and relatively light at IR wavelengths. These reflectance characteristics are highly advantageous in applications where heat buildup due to the absorption of IR radiation is to be minimized. The improved IR reflectance characteristics of the present bismuth manganese oxide pigments is also highly advantageous in applications where detection by IR sensors is to be minimized.

The ability of the present bismuth manganese oxide pigments to reduce heat buildup from IR radiation is illustrated in Table 3. Samples 7 and 11 include bismuth manganese oxide pigments of the present invention, while Samples 8–10, 12 and 13 comprise commercially available black pigments. Specifically, Sample 7 comprises 1 weight percent $Bi_2Mn_4O_{10}$ and 99 weight percent RPVC; Sample 8 comprises 0.25 weight percent carbon black (Raven 1190) and 99.75 weight percent RPVC; Sample 9 comprises 1 weight percent $CuCr_2O_4$ and 99 weight percent RPVC; Sample 10 comprises 1 weight percent $(Cr,Fe)(Fe,Cr)_2O_4$ and 99 weight percent RPVC; Sample 11 comprises 1 weight percent $Bi_2Mn_4O_{10}$, 9 weight percent $TiO_2$ and 90 weight percent RPVC; Sample 12 comprises 1 weight percent $CuCr_2O_4$, 9 weight percent $TiO_2$ and 90 weight percent RPVC; and Sample 13 comprises 1 weight percent $(Cr,Fe)(Fe,Cr)_2O_4$, 9 weight percent $TiO_2$ and 90 weight percent RPVC.

TABLE 3

Infrared Radiation Induced Heat Build Up

| Sample | Tm (° F.) | ΔT (° F.) | ΔTv | ΔTh |
| --- | --- | --- | --- | --- |
| 7 | 149.2 | 76.9 | 60.4 | 72.9 |
| 8 | 166.2 | 94.1 | — | — |
| 9 | 185.1 | 112.8 | 88.7 | 108.0 |
| 10 | 168.3 | 96.1 | 75.5 | 91.8 |
| 11 | 132.9 | 60.5 | 47.4 | 57.6 |
| 12 | 160.9 | 88.4 | 70.0 | 84.6 |
| 13 | 147.1 | 74.8 | 58.5 | 71.1 |

Tm is maximum temperature of sample; ΔT is temperature rise above ambient temperature; ΔTv indicates vertical heat buildup; and ΔTh indicates horizontal heat buildup.

As shown in Table 3, Samples 7 and 11 comprising bismuth manganese oxide pigments in accordance with the present invention exhibit substantially decreased heat buildup when subjected to IR radiation in comparison with commercially available pigments. The ability of the present bismuth manganese oxide pigments to reduce IR-induced heat buildup has particular significance for uses such as architectural, automotive, military, aerospace, industrial and electronics applications.

Whereas particular embodiments of this invention have been described above for purposes of illustration, it will be evident to those skilled in the art that numerous variations of this details of the present invention may be made without departing from the invention as defined in the appended claims.

What is claimed is:

1. A pigment comprising bismuth manganese oxide, wherein the bismuth manganese oxide comprises $Bi_2Mn_4O_{10}$.

2. The pigment of claim 1, wherein the bismuth manganese oxide comprises an orthorhombic crystal structure.

3. The pigment of claim 1, wherein the pigment has an average particle size of from about 0.5 to about 20 microns.

4. A coating composition comprising:
   a liquid carrier; and
   a pigment comprising bismuth manganese oxide dispersed in the carrier, wherein the bismuth manganese oxide comprises $Bi_2Mn_4O_{10}$.

5. The coating composition of claim 4, wherein the pigment comprises from about 0.1 to about 50 weight percent of the coating composition.

6. The coating composition of claim 4, wherein the liquid carrier comprises at least one solvent selected from pine oils, vegetable oils, mineral oils, synthetic resins and natural resins.

7. The coating composition of claim 4, wherein the bismuth manganese oxide comprises an orthorhombic crystal structure.

8. An enamel composition comprising:
   at least one glass frit; and
   a pigment comprising bismuth manganese oxide, wherein the bismuth manganese oxide comprises $Bi_2Mn_4O_{10}$.

9. The enamel composition of claim 8, wherein the bismuth manganese oxide comprises an orthorhombic crystal structure.

10. The enamel composition of claim 8, wherein the pigment comprises from about 0.1 to about 70 weight percent and the at least one glass frit comprises from about 30 to about 99.9 weight percent of the enamel composition.

11. An article comprising:
   a substrate matrix; and
   a pigment comprising bismuth manganese oxide dispersed in the substrate matrix, wherein the bismuth manganese oxide comprises $Bi_2Mn_4O_{10}$.

12. The article of claim 11, wherein the substrate matrix comprises polyvinylchloride.

13. The article of claim 11, wherein the article has an IR reflectance of greater than about 50 percent at a wavelength of 1,100 nm.

14. An article comprising:
   a substrate; and
   a coating including a pigment comprising bismuth manganese oxide covering at least a portion of the substrate, wherein the bismuth manganese oxide comprises $Bi_2Mn_4O_{10}$.

15. The article of claim 14, wherein the substrate comprises glass, ceramic, metal, plastic, carbon or composite.

16. The article of claim 14, wherein the substrate comprises glass.

17. The article of claim 14, wherein the coating has an IR reflectance of greater than about 50 percent at a wavelength of 1,100 nm.

18. A method of making a bismuth manganese oxide pigment comprising:
   mixing powders of bismuth oxide and manganese oxide in a weight ratio which produces $Bi_2Mn_4O_{10}$ upon calcination of the mixture; and
   calcining the mixture.

19. The method of claim 18, further comprising mixing the bismuth oxide and manganese oxide powders in a weight ratio of from about 1:2 to about 2:1.

20. The method of claim 18, wherein the bismuth manganese oxide comprises an orthorhombic crystal structure.

21. The method of claim 18, further comprising comminuting the calcined mixture to an average particle size of from about 0.5 to about 5 microns.

22. A method of coloring a substrate comprising:
   providing a substrate; and
   adding a pigment comprising bismuth manganese oxide to the substrate, wherein the bismuth manganese oxide comprises $Bi_2Mn_4O_{10}$.

23. The method of claim 22, wherein the pigment is added to the substrate by dispersing the pigment in a matrix of the substrate.

24. The method of claim 22, wherein the pigment is added as a coating at least a portion of the substrate with the pigment.

25. The method of claim 22, wherein the bismuth manganese oxide comprises an orthorhombic crystal structure.

* * * * *